United States Patent
Koide

(10) Patent No.: US 7,169,709 B2
(45) Date of Patent: Jan. 30, 2007

(54) LASER ETCHING METHOD AND APPARATUS THEREFOR

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 10/943,026

(22) Filed: Sep. 17, 2004

(65) Prior Publication Data

US 2005/0032380 A1 Feb. 10, 2005

Related U.S. Application Data

(62) Division of application No. 09/717,242, filed on Nov. 22, 2000, now Pat. No. 6,861,364.

(30) Foreign Application Priority Data

| Nov. 30, 1999 | (JP) | ................................ 11-339556 |
| Nov. 30, 1999 | (JP) | ................................ 11-339557 |
| Nov. 30, 1999 | (JP) | ................................ 11-339558 |
| Nov. 30, 1999 | (JP) | ................................ 11-339559 |
| Nov. 30, 1999 | (JP) | ................................ 11-339560 |

(51) Int. Cl.
*H01L 21/302* (2006.01)

(52) U.S. Cl. ........................ 438/710; 438/718; 438/719

(58) Field of Classification Search ................ 438/710, 438/715, 718, 719, 706, 689
See application file for complete search history.

(56) References Cited

U.S. PATENT DOCUMENTS

| 4,292,093 A | 9/1981 | Ownby ........................ 134/1.3 |
| 4,739,385 A | 4/1988 | Bethea ........................ 257/184 |
| 4,764,930 A | 8/1988 | Bille ........................... 372/23 |
| 5,024,968 A * | 6/1991 | Engelsberg ................. 438/597 |
| 5,196,376 A | 3/1993 | Reche ........................ 437/225 |
| 5,362,941 A | 11/1994 | Johnson .................. 219/121.84 |
| 5,601,737 A | 2/1997 | Asahi .................... 219/121.66 |
| 5,703,709 A | 12/1997 | Mori .......................... 359/196 |
| 5,720,894 A | 2/1998 | Neev ........................... 216/65 |
| 5,747,120 A | 5/1998 | McLean ..................... 427/596 |
| 5,814,156 A * | 9/1998 | Elliott et al. ................... 134/1 |

(Continued)

FOREIGN PATENT DOCUMENTS

EP 0 618 037 10/1994

(Continued)

OTHER PUBLICATIONS

The Mineral Quartz http://mineral.galleries.com/minerals/sillicate/quartz/quartz.htm, no date available.

*Primary Examiner*—Kin-Chan Chen
(74) *Attorney, Agent, or Firm*—Fitzpatrick, Cella, Harper & Scinto

(57) ABSTRACT

The invention provides a laser etching method for optical ablation working by irradiating a work article formed of an inorganic material with a laser light from a laser oscillator capable of emitting in succession light pulses of a large energy density in space and time with a pulse radiation time not exceeding 1 picosecond, wherein, in laser etching of the work article formed of the inorganic material by irradiation thereof with the laser light from the laser oscillator with a predetermined pattern and with a predetermined energy density, there is utilized means for preventing deposition of a work by-product around the etching position.

15 Claims, 7 Drawing Sheets

U.S. PATENT DOCUMENTS

| | | | |
|---|---|---|---|
| 5,950,071 A | 9/1999 | Hammnd | 438/115 |
| 6,016,324 A | 1/2000 | Rieger | 372/25 |
| 6,165,649 A * | 12/2000 | Grenon et al. | 430/5 |
| 6,190,836 B1 * | 2/2001 | Grenon et al. | 430/311 |
| 6,333,485 B1 * | 12/2001 | Haight et al. | 219/121.68 |
| 6,388,366 B1 * | 5/2002 | Pryor | 313/311 |
| 6,582,857 B1 * | 6/2003 | Flanigan et al. | 430/5 |

FOREIGN PATENT DOCUMENTS

| | | |
|---|---|---|
| EP | 0 927 595 | 7/1999 |
| EP | 0 931 620 | 7/1999 |
| EP | 0 933 712 | 8/1999 |
| JP | 59 073 189 | 4/1984 |
| JP | 59 182 529 | 10/1984 |
| JP | 11 254 174 | 9/1999 |
| JP | 11 316 760 | 11/1999 |
| WO | WO 97 247 68 | 7/1997 |
| WO | WO 98 550 35 | 12/1998 |
| WO | WO 98 104 94 | 3/1999 |

* cited by examiner

LASER ETCHING METHOD AND APPARATUS THEREFOR

This application is a division of U.S. application Ser. No. 09/717,242 filed on Nov. 22, 2000, now U.S. Pat. No. 6,861,364.

BACKGROUND OF THE INVENTION

1. Field of the Invention

The present invention relates to a laser etching method and a laser etching apparatus for working an article with a laser beam, and more particularly to a laser etching method and a laser etching apparatus capable, in working the article of an inorganic substance, of working without generating deposition around the etching position, and adapted for fine working of a material for a micromachine, an IC or a diode device.

2. Related Background Art

In fine working of a structural member by laser working, it is customary to utilize a harmonic wave of an excimer laser or a YAG laser.

However, as the energy density of the laser light in the oscillated pulse is limited to a level of 100 megawatts at maximum, such laser working method is hardly applicable to an article formed of an inorganic material and is only applicable to the sublimation ablation working of articles principally composed of organic materials. For this reason, the fine working of the article formed of inorganic materials has been achieved by a lithographic process including steps of resist coating, resist patterning by exposure, resist development, etching utilizing the resist pattern and resist ashing for each material, but such process is associated with drawbacks of an increased cost resulting from the complex process steps and a large investment for the production facility in consideration of the process tact time.

In order to resolve such drawbacks, the present applicant proposes, for example in the Japanese Patent Application No. 11-316760, a laser working method for fine working of a structure in an article formed of inorganic materials by sublimation ablation working, utilizing a feature that the laser light emitted from a laser oscillator with a pulse emission time of 1 picosecond or less has a drastically high energy density in time and a feature that the laser light is not converted into thermal energy but is directly converted into a lattice bond cleaving energy because of the very short laser irradiation time.

However the above-mentioned laser working method for sublimation ablation working is capable of etching the article formed of the inorganic material by ablation sublimation, but, in certain materials, the sublimated and gasified atoms or molecules instantly cause recombination, thereby being liquefied and deposited in the etching position in the vicinity thereof-and solidified, whereby the vicinity of the etching position cannot be maintained clean or the etching itself can be prevented by the deposition of such by-products.

Such drawbacks become particularly conspicuous in materials in crystalline or amorphous solid state by covalent bonds. The cause for such phenomenon is not yet clarified, but is considered to be inherent to the materials having covalent bonds of a higher bonding energy, since the above-mentioned drawbacks are not conspicuous in the crystalline materials based on metal bonding or ionic bonding or in the amorphous materials based on ionic bonding.

SUMMARY OF THE INVENTION

In consideration of the foregoing, the object of the present invention is to provide a laser etching method and a laser etching apparatus capable, in laser etching of an article formed of an inorganic material, of working without deposition around the etching position and of fine working for a material of a micromachine, an IC or a diode device.

The above-mentioned object can be attained, according to the present invention, by a laser etching method and a laser etching apparatus constructed as described in the following (1) to (35):

(1) A laser etching method for optical ablation working by irradiating a work article formed of inorganic materials with a laser light from a laser oscillator capable of emitting in succession light pulses of a large energy density in space and time with a pulse radiation time not exceeding 1 picosecond:

wherein, in laser etching of the work article formed of the inorganic material by irradiation thereof with the laser light from the laser oscillator with a predetermined pattern and with a predetermined energy density, there is utilized means for preventing deposition of a work by-product around the etching position.

(2) A laser etching method according to (1), wherein the means for preventing deposition of the work by-product around the etching position is adapted for working the work article by irradiation with the laser light, by intermittent irradiation with an interval longer than the oscillation frequency of a pulsed laser.

(3) A laser etching method according to (1), wherein the means for preventing deposition of the work by-product around the etching position is adapted for working the work article by irradiation with the laser light, in a state where a gas flow is generated in the work position of the work article.

(4) A laser etching method according to (3), wherein the gas flow in the work position of the work article is an air flow.

(5) A laser etching method according to (3), wherein the gas flow in the work position of the work article is a nitrogen flow.

(6) A laser etching method according to (1), wherein the means for preventing deposition of the work by-product around the etching position is adapted for working the work article by irradiation with the laser light, by executing laser light irradiation in a state where the work article is positioned in an atmosphere other than air.

(7) A laser etching method according to (6), wherein the atmosphere other than air is gas of an atomic weight smaller than that of nitrogen molecule.

(8) A laser etching method according to (7), wherein the gas is helium gas.

(9) A laser etching method according to (7), wherein the gas is hydrogen gas.

(10) A laser etching method according to (6), wherein the atmosphere other than air is liquid of which medium transmits the laser light.

(11) A laser etching method according to (10), wherein the liquid transmitting the laser light is water.

(12) A laser etching method according to (10), wherein the liquid transmitting the laser light is silicone oil.

(13) A laser etching method according to (1), wherein the means for preventing deposition of the work by-product around the etching position is adapted for working the work article by irradiation with the laser light, in a state where the work article is heated to 200° C. or higher.

(14) A laser etching method according to (1), wherein the means for preventing deposition of the work by-product around the etching position is adapted for working the work article by irradiation with the laser light, in a state where the work article is provided in a gaseous atmosphere not exceeding 10 Torr.

(15) A laser etching method according to (1), wherein the inorganic material is a crystal of covalent bond.

(16) A laser etching method according to (1), wherein the inorganic material is crystal or amorphous silicon.

(17) A laser etching method according to (1), wherein the inorganic material is a silicon compound.

(18) A laser etching method according to (1), wherein the laser oscillator has a spatial compression device for light propagation.

(19) A laser etching method according to (18), wherein the spatial compression device for light propagation comprises chirping pulse generation means and vertical mode synchronization means utilizing the optical wavelength dispersing characteristics.

(20) A laser etching apparatus provided with from a laser oscillator capable of emitting in succession light pulses of a large energy density in space and time with a pulse radiation time not exceeding 1 picosecond and adapted for optical ablation working of a work article formed of inorganic materials by irradiation of the work article with a laser light from the laser oscillator with a predetermined pattern and with a predetermined energy density, the apparatus comprising:

means for preventing deposition of a work by-product around the etching position for laser etching by irradiation of the work article formed of the inorganic material.

(21) A laser etching apparatus according to (20), wherein the means for preventing deposition of the work by-product around the etching position is means including a mechanical shutter for achieving intermittent irradiation with an interval longer than the oscillation frequency of a pulsed laser by controlling the laser light from the laser oscillator by open/close control, thereby working the work article.

(22) A laser etching apparatus according to (20), wherein the means for preventing deposition of the work by-product around the etching position includes means for causing a gas flow in the work position of the work article formed of the inorganic material, and adapted for working the work article by irradiating the work article with the laser light in a state where the gas flow is caused in the work position of the work material formed of the inorganic material.

(23) A laser etching apparatus according to (22), wherein the means for causing the gas flow in the work position of the work article is adapted to cause an air flow.

(24) A laser etching apparatus according to (22), wherein the means for causing the gas flow in the work position of the work article is adapted to cause a nitrogen flow.

(25) A laser etching apparatus according to (20), wherein the means for preventing deposition of the work by-product around the etching position is means for working the work article includes a chamber and a light transmitting member capable of closing the chamber, and is adapted to work the work article formed of the inorganic material by positioning the work article in the chamber filled with a medium other than air and closed by the light transmitting member, and irradiating the work article with the laser light through the light transmitting member.

(26) A laser etching apparatus according to (25), wherein the medium filled in the chamber other than air is gas of an atomic weight smaller than that of nitrogen molecule.

(27) A laser etching apparatus according to (26), wherein the gas is helium gas.

(28) A laser etching apparatus according to (26), wherein the gas is hydrogen gas.

(29) A laser etching apparatus according to (25), wherein the medium filled in the chamber other than air is liquid capable of transmitting the laser light.

(30) A laser etching apparatus according to (29), wherein the liquid transmitting the laser light is water.

(31) A laser etching apparatus according to (29), wherein the liquid transmitting the laser light is silicone oil.

(32) A laser etching apparatus according to (20), wherein the means for preventing deposition of the work by-product around the etching position is includes a heater to be controlled at a predetermined temperature by temperature adjusting means and is adapted for working the work article by maintaining the work article formed of the inorganic material at the predetermined temperature and irradiating the work article with the laser light.

(33) A laser etching apparatus according to (20), wherein the means for preventing deposition of the work by-product around the etching position includes a chamber and a light transmitting member capable of closing the chamber, and is adapted for working the work article formed of the inorganic material by irradiation with the laser light, by positioning the work article in the chamber evacuated to a pressure to a pressure not exceeding 10 Torr and closed by the light transmitting member and irradiating the work article with the laser light through the light transmitting member.

(34) A laser etching apparatus according to (20), wherein the laser oscillator has a spatial compression device for light propagation.

(35) A laser etching apparatus according to (34), wherein the spatial compression device for light propagation includes chirping pulse generation means and vertical mode synchronization means utilizing the optical wavelength dispersing characteristics.

DESCRIPTION OF THE PREFERRED EMBODIMENTS

Figure 1:
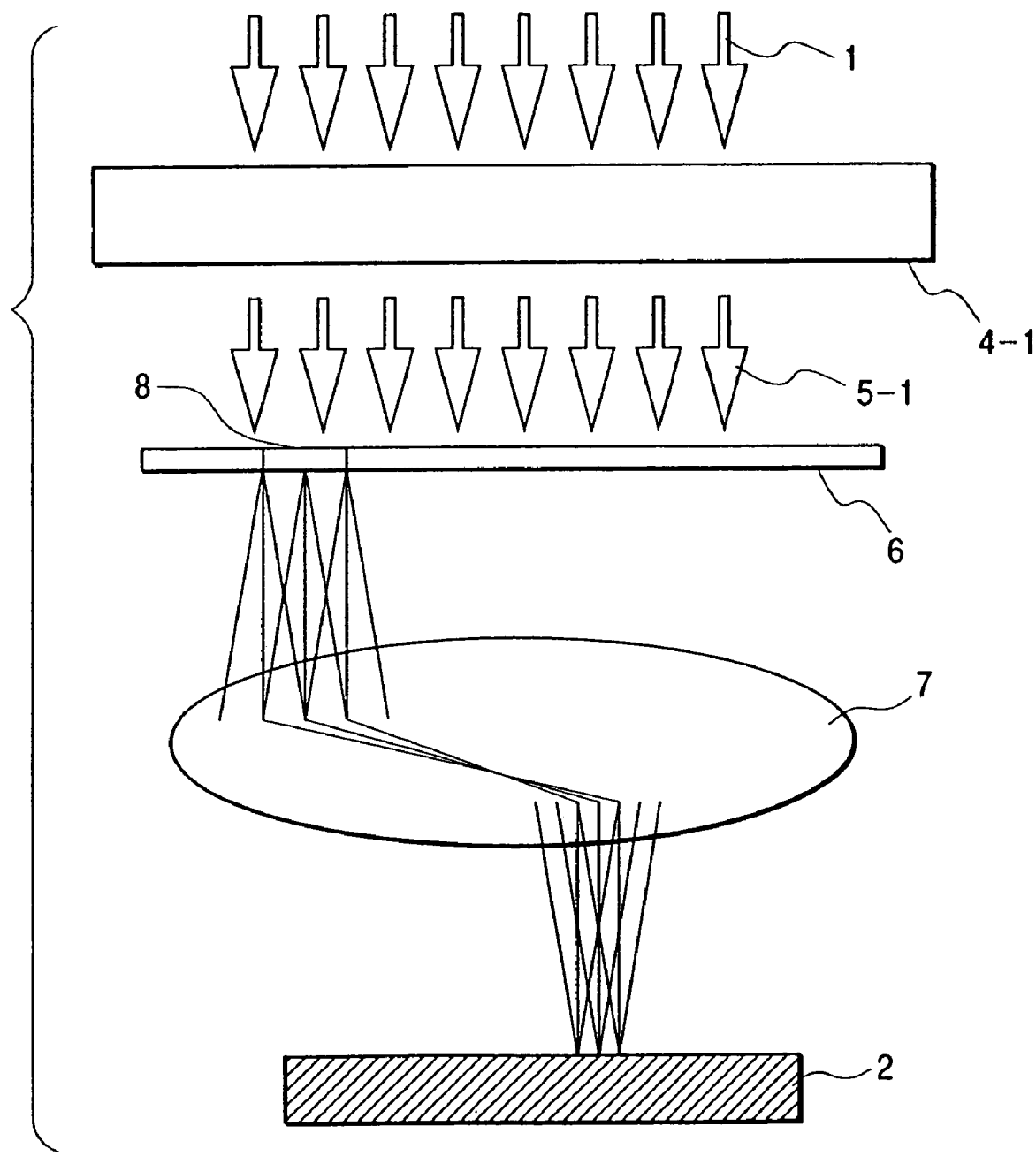
FIG. 1 is a view showing the laser etching method in an embodiment 1 of the present invention.

The present invention, in the embodiments based on the foregoing configurations, allows laser etching of a work article formed of an inorganic material without generating deposits around the etching position.

In a first embodiment, the irradiation of the work article is executed with intermittent irradiation including an irradiation pause time or an interval longer than the oscillation frequency of the pulsed laser, thereby avoiding deposition around the etching position and enabling fine working of the material for a micromachine, an IC or a diode device.

The atomic or molecular particles released by ablation generates a plasma cloud around the etching position, and such plasma cloud prevents the emission of the atomic or molecular particles by ablation if the working is continuously executed. Thus the sublimated material liquefies or solidifies in the vicinity of the working position, thereby forming a deposit around the etching position.

On the other hand, in the above-described configuration utilizing the intermittent irradiation of the work article with the interval longer than the oscillation frequency of the pulsed laser, an etching pause time is provided after the etching for a predetermined duration so that the etching is re-started after the plasma cloud of the atomic or molecular particles is scattered. It is thus rendered possible to hinder deposition around the etching position, thereby avoiding generation of solid deposit around the etching position.

Also in a second embodiment, the working is executed in a state where a gas flow is caused in the work position of the work article, thereby preventing deposition around the etching position and enabling fine working of the material for a micromachine, an IC or a diode device. The aforementioned atomic or molecular particles released by ablation remain less in the vicinity of the work position by collision with and removal by the gas flow from the work position, whereby prevented is the generation of solid deposit around the etching position.

Also in a third embodiment, the working by the laser light is executed in a state where the work article is positioned in an atmosphere other than air, thereby preventing deposition around the etching position and enabling fine working of the material for a micromachine, an IC or a diode device.

1) In case helium is employed for forming the atmosphere other than air, the atomic or molecular particles released by ablation show little change in the proceeding direction even in case of collision with the helium atoms of a low atomic weight, thereby tending to move straight and remaining less in the vicinity of the etching position, whereby prevented is the generation of solid deposit around the etching position.

2) In case hydrogen gas is employed for forming the atmosphere other than air, a particular advantage can be obtained in case the work article is composed of silicon, in addition to the above-mentioned effect relating to the atomic weight, though danger in handling increases. The silicon atoms released by ablation chemically combine with the hydrogen atoms to be converted into siline gas ($SiH_4$) which is gaseous and stable and is hardly deposited around the etching position, whereby prevented is the generation of solid deposit around the etching position.

3) In case water is employed for forming the atmosphere other than air, the atomic or molecular particles released by ablation are prevented from deposition in the vicinity of the etching position by the presence of the water molecules and are fetched in such water molecules, thus being prevented from re-deposition, whereby prevented is the generation of solid deposit around the etching position. In this case, however, it is required that the optical absorbance of the work article is higher than that of water and that a gaseous by-product is not generated by ablation (because a gaseous by-product, if generated, remains as a bubble in the working position because of the high surface tension of water, thereby hindering the light passing by refraction and disabling the high precision working.

4) In case silicone oil is employed for forming the atmosphere other than air, the atomic or molecular particles released by ablation are prevented from deposition in the vicinity of the etching position by the presence of the silicone oil molecules and are fetched in such silicone oil molecules, thus being prevented from re-deposition, whereby prevented is the generation of solid deposit around the etching position. In this case, however, it is required that the optical absorbance of the work article is higher than that of silicone oil (a gaseous by-product, if generated by ablation, can be tolerated as it does not remain in a state stuck to the work article because of the low surface tension of silicone oil, and can be removed from the work article by a flow caused by the liquid pressure if the viscosity of the silicone oil based on the molecular weight thereof is maintained low).

It is thus rendered possible to prevent solid deposit around the etching position by forming various atmospheres other than air as explained in the foregoing 1) to 4).

Also in a fourth embodiment, the working is executed in a state where the work article is heated to 200° C. or higher, thereby preventing deposition around the etching position and enabling fine working of the material for a micromachine, an IC or a diode device. The aforementioned atomic or molecular particles released by ablation require a longer time for cooling and liquefaction by the heat from the heated inorganic material, and liquefy or solidify by cooling from the air in a position distant from the inorganic material constituting the work article in the course of flight, thereby hindering solid deposition in the vicinity of the etching position, whereby prevented is the generation of solid deposit around the etching position.

Also in a fifth embodiment, the working is executed in a state where the work article is maintained in an atmosphere of a pressure not exceeding 10 Torr, thereby preventing deposition around the etching position and enabling fine working of the material for a micromachine, an IC or a diode device. The aforementioned atomic or molecular particles released by ablation fly in a space of a low pressure with a fewer number of molecules or atoms and show a lower probability of collision between the particles and a longer average flight length, thereby tending to move straight and remaining less in the vicinity of the etching position, whereby prevented is the generation of solid deposit around the etching position.

In the following the present invention will be clarified in detail by preferred embodiments thereof.

[Embodiment 1]

At first reference is made to FIG. 1 for outlining the working method of an embodiment 1 of the present invention. A laser light 1, emitted from an unrepresented laser oscillator, capable of emitting the laser light with an extremely short pulse emission time (not exceeding 1 picosecond), after being modulated by a mechanical shutter 4-1 into a pulse train 5-1 of laser light cut in time, illuminates a photomask 6, and the light transmitted by a mask pattern 8 is projected and focused through a projection lens 7. The projected image is focused on the surface of a work article 2 formed of an inorganic material.

The laser light 1 is irradiated in pulses in such state to effect sublimation ablation working of the work article 2, and, in the present embodiment, the laser light irradiation is controlled by the open/close control of the mechanical shutter 4-1 to etch the work article 2 in an intermittent sequence.

In the working method of the present embodiment, the intermittent laser irradiation etching was executed by employing a laser light of a wavelength of 775 nm, a laser pulse oscillation frequency of 1 kHz, a laser irradiation pulse duration of about 150 femtoseconds, an optical energy of about 7μ joules per pulse concentrated in an area of 20 μm φ through the photomask 6 and the projection lens 7, namely under a laser irradiating condition with an energy density of 15 terawatt/cm$^2$ per pulse, on a silicon crystal in the air of normal temperature and normal pressure wherein a cycle of on-state for 0.1 seconds (about 100 laser pulses are irradiated by the train of laser pulses: X) and off-state for 0.5 seconds (the laser pulses are not irradiated: Y) are repeated 5 times by the mechanical shutter 4-1 thereby giving about 500 laser pulses in total to form an etched hole of a depth of about 30 μm.

Figure 4:
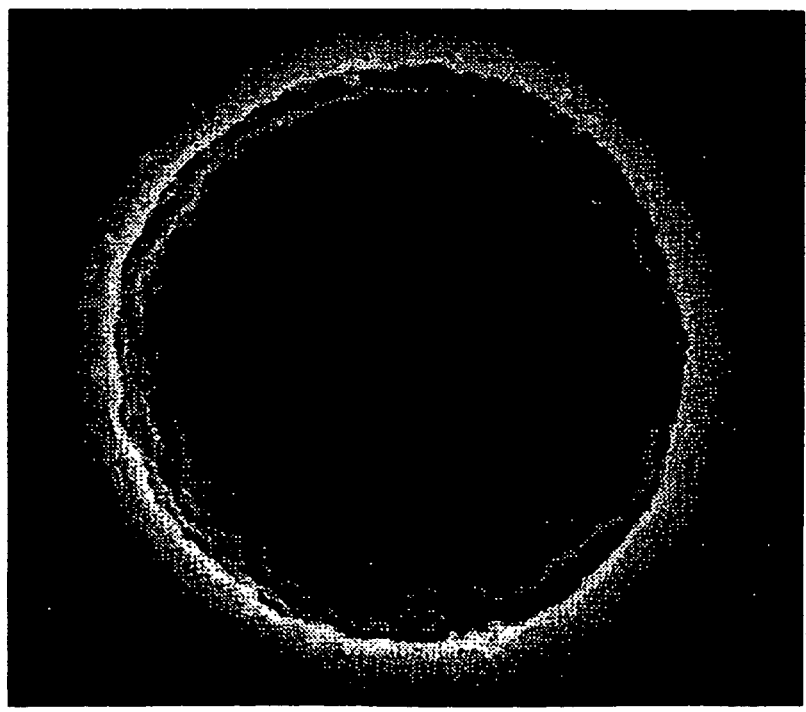
FIG. 4 is a view showing the work state of the laser etching method of the embodiment 1 of the present invention.
Figure 5:
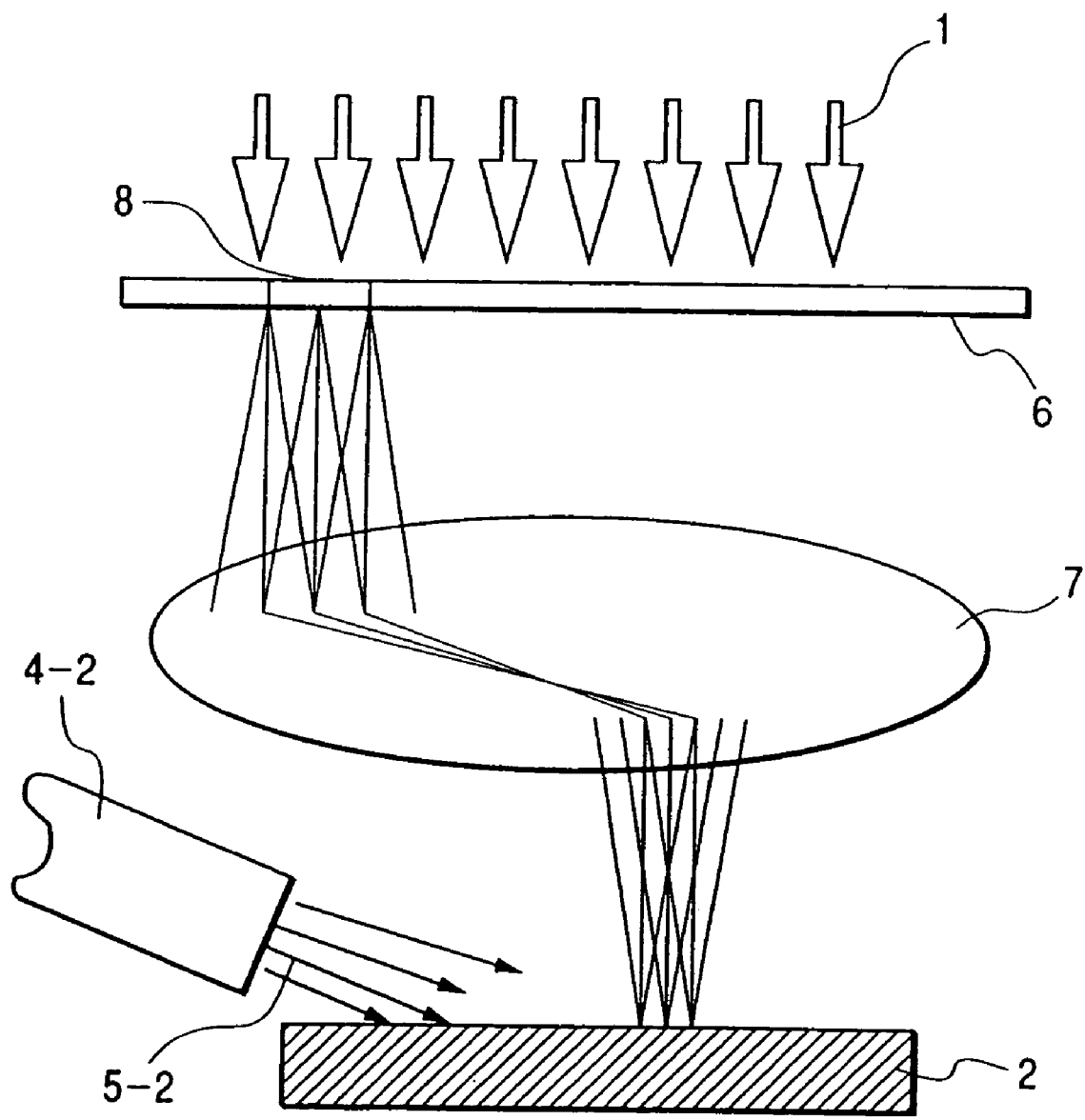
FIG. 5 is a view showing the laser etching method in an embodiment 2 of the present invention.

The working according to the present embodiment allows to achieve clean etching without deposit around the worked hole, as shown in FIG. 4.

Figure 3:
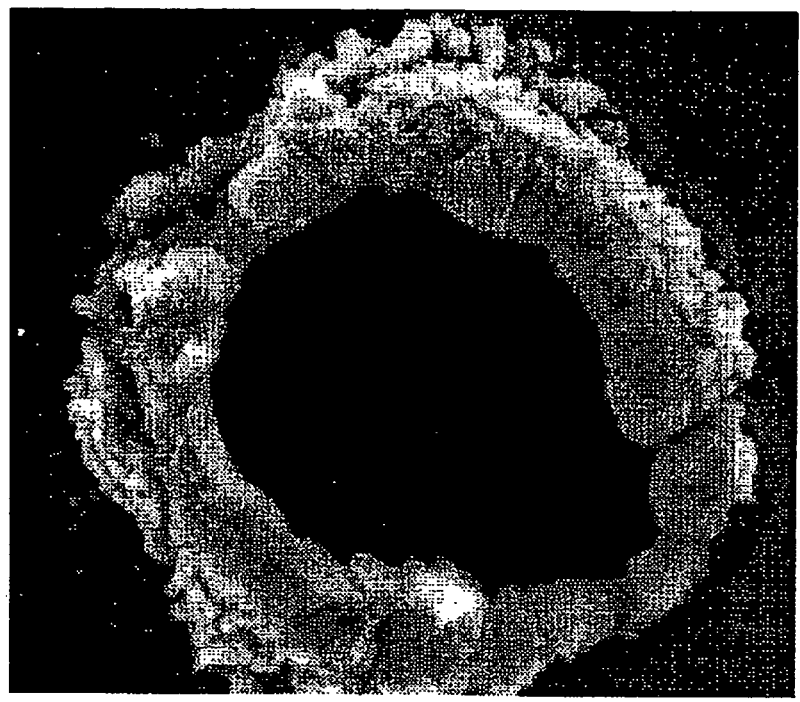
FIG. 3 is a view showing the work state of a conventional laser etching method as comparison.

On the other hand, in case the silicon crystal was continuously etched in the air of normal temperature and normal pressure with the total laser irradiation pulses of about 500 pulses under the laser irradiation condition same as above and with the mechanical shutter 4-1 in the on-state (non-shielded state) for 0.5 seconds, the etched hole showed a depth of about 30 μm, but liquefied silicon was deposited in solid around the worked hole as shown in FIG. 3. The solidified silicon could not be removed easily by mere rinsing with running water.

In comparison with the continuous etching method, the working method of the present embodiment allows to form an extremely clean worked hole without deposit.

[Embodiment 2]

Figure 2:
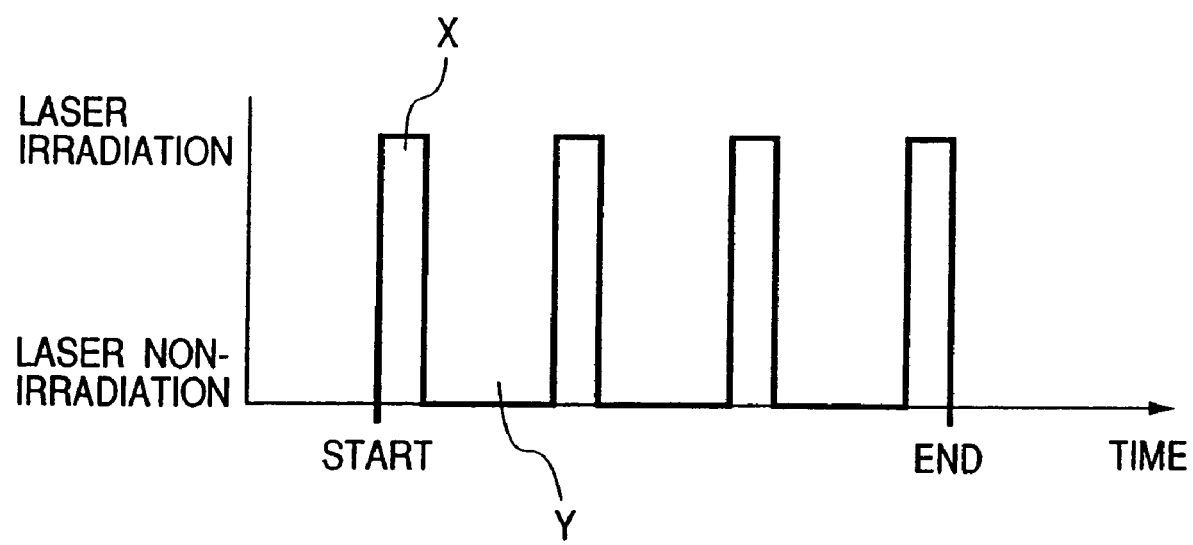
FIG. 2 is a view showing the sequence of the laser irradiation method in the embodiment 1 of the present invention.

Now reference is made to FIG. 2 for outlining the working method of the present embodiment. A laser light 1, emitted from an unrepresented laser oscillator, capable of emitting the laser light with an extremely short pulse emission time (not exceeding 1 picosecond), illuminates a photomask 6, and the light transmitted by a mask pattern 8 is projected and focused through a projection lens 7. The projected image is focused on the surface of a work article 2 formed of an inorganic material.

On the other hand, a gas nozzle 4-2 emits nitrogen gas 5-2 in a direction indicated by an arrow whereby a gas flow is generated on the surface of the work article 2. The laser light 1 is irradiated in pulses to effect sublimation ablation working of the work article 2.

In the working method of the present embodiment, the continuous etching was executed, by employing a laser light of a wavelength of 775 nm, a laser pulse oscillation frequency of 1 kHz, a laser irradiation pulse duration of about 150 femtoseconds, an optical energy of about 7μ joules per pulse concentrated in an area of 20 μm φ through the photomask 6 and the projection lens 7, namely under a laser irradiating condition with an energy density of 15 terawatt/cm$^2$ per pulse, on a silicon crystal in the air of normal temperature and normal pressure under an irradiation of 0.5 seconds for giving about 500 laser pulses in total and under a nitrogen gas blow of about 1 m/sec to form an etched hole of a depth of about 30 μm.

The working method of the present embodiment under nitrogen gas blowing to the silicon crystal allows to achieve clean etching without deposit around the worked hole, as shown in FIG. 4. On the other hand, in case the silicon crystal was etched in the air atmosphere without the gas blowing shows liquefied silicon deposited in solid around the worked hole as shown in FIG. 3. The solidified silicon could not be removed easily by mere rinsing with running water. In comparison with the working in the still air atmosphere, the working method of the present embodiment allows to form an extremely clean worked hole without deposit. Also the optimum rate of the gas flow is considered variable according to the size of the working area and the working speed depending on the laser irradiation energy.

[Embodiment 3]

Figure 6:
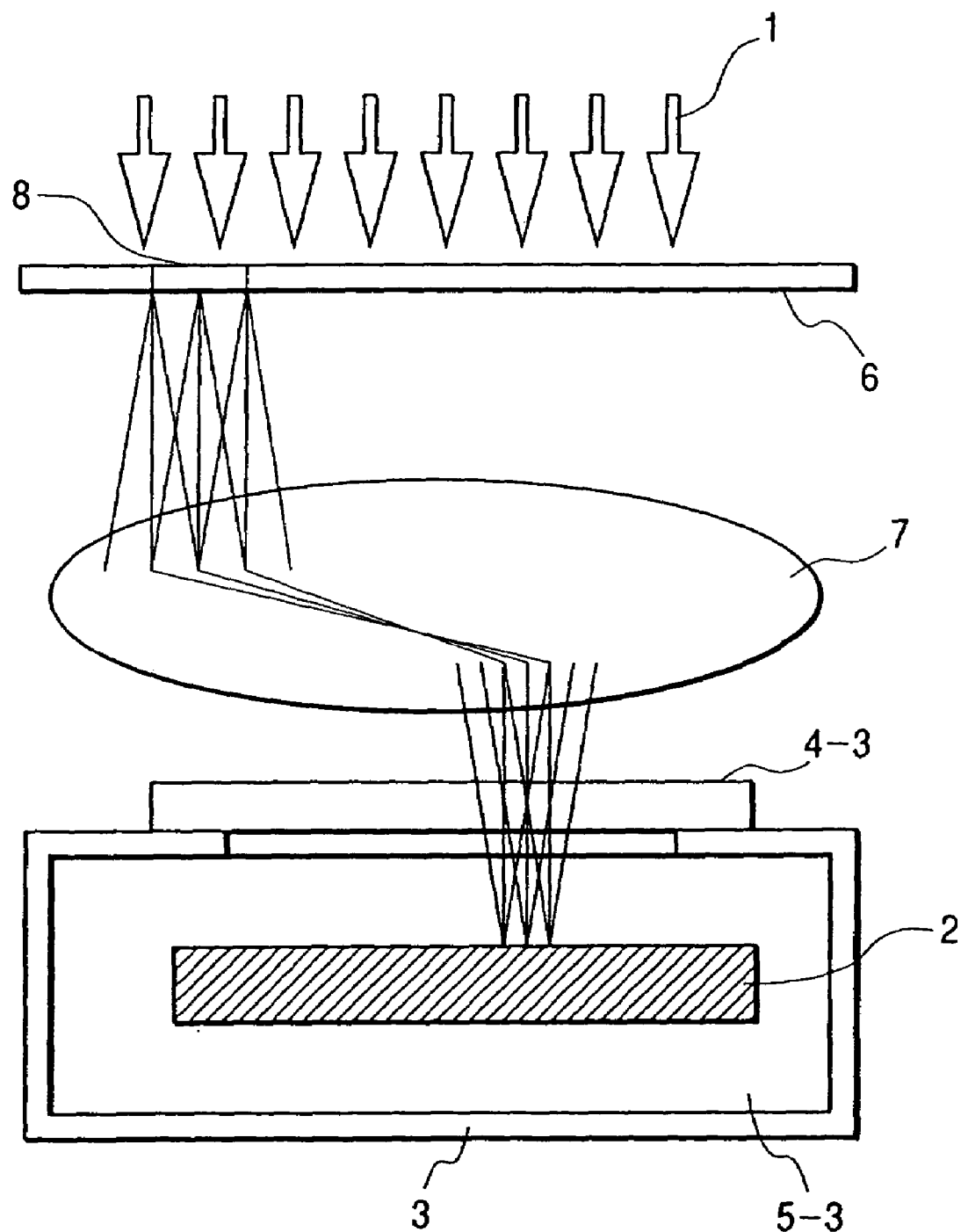
FIG. 6 is a view showing the laser etching method in an embodiment 3 of the present invention.

Now reference is made to FIG. 6 for outlining the working method of the present embodiment. A laser light 1, emitted from an unrepresented laser oscillator, capable of emitting the laser light with an extremely short pulse emission time (not exceeding 1 picosecond), illuminates a photomask 6, and the light transmitted by a mask pattern 8 is projected and focused through a projection lens 7. The projected image is focused on the surface of a work article 2 formed of an inorganic material.

The work article 2 is closed in a chamber 3 and a window 4-3 closing the chamber 3 and the space around the work article 2 is filled with a work article atmosphere material 5-3. In such state, the laser light 1 is irradiated in pulses to execute sublimation ablation etching of the work article 2.

In the working method of the present embodiment, the work article 2 was composed of crystalline silicon, and the chamber 3 was filled with helium gas of normal pressure as the work article atmosphere material 5-3.

In the working method of the present embodiment, the continuous etching was executed, by employing a laser light of a wavelength of 775 nm, a laser pulse oscillation frequency of 1 kHz, a laser irradiation pulse duration of about 150 femtoseconds, an optical energy of about 7μ joules per pulse concentrated in an area of 20 μm φ through the photomask 6 and the projection lens 7, namely under a laser irradiating condition with an energy density of 15 terawatt/cm$^2$ per pulse, on a silicon crystal under an irradiation for 0.5 seconds for giving about 500 laser pulses in total to form an etched hole of a depth of about 30 μm.

The working method of the present embodiment, in case of working crystalline silicon in a helium gas atmosphere, allows to achieve clean etching without deposit around the worked hole, as shown in FIG. 4.

On the other hand, in case the crystalline silicon was etched in the air atmosphere shows liquefied silicon deposited in solid around the worked hole as shown in FIG. 3. The solidified silicon could not be removed easily by mere rinsing with running water. In comparison, the working method of the present embodiment allows to form an extremely clean.

Furthermore such working is not restrictive, and an extremely clean hole can also be obtained in case of:

employing silicon as the work article 2 and hydrogen gas as the work article atmosphere material 5-3; or employing silicon as the work article 2 and silicone oil as the work article atmosphere material 5-3; or employing gallium-arsine as the work article 2 and helium gas as the work article atmosphere material 5-3; or employing gallium-arsine as the work article 2 and water as the work article atmosphere material 5-3; or employing gallium-arsine as the work article 2 and silicone oil as the work article atmosphere material 5-3.

[Embodiment 4]

Figure 7:
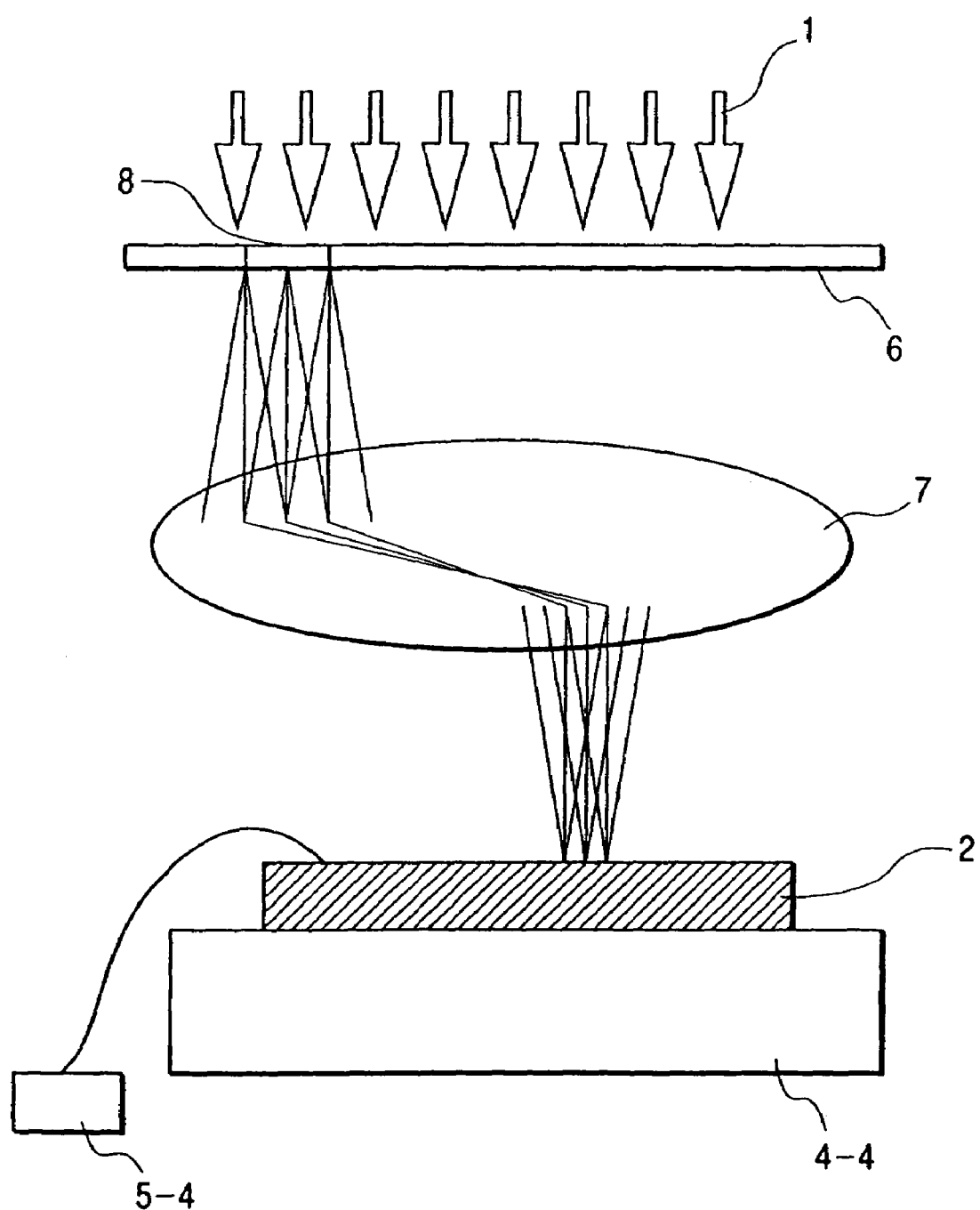
FIG. 7 is a view showing the laser etching method in an embodiment 4 of the present invention.

Now reference is made to FIG. 7 for outlining the working method of the present embodiment. A laser light 1, emitted from an unrepresented laser oscillator, capable of emitting the laser light with an extremely short pulse emission time (not exceeding 1 picosecond), illuminates a photomask 6, and the light transmitted by a mask pattern 8 is projected and focused through a projection lens 7. The projected image is focused on the surface of a work article 2 formed of an inorganic material.

On the other hand, the work article 2 is heated, by a heater 4-4 and the temperature is measured by a thermometer 5-4. A constant temperature is maintained by turning on and off the heater 4-4 by an unrepresented temperature controller.

The laser light 1 is irradiated in pulses in such state to effect sublimation ablation working of the work article 2.

In the working method of the present embodiment, the continuous laser irradiation etching was executed by employing a laser light of a wavelength of 775 nm, a laser pulse oscillation frequency of 1 kHz, a laser irradiation pulse duration of about 150 femtoseconds, an optical energy of about 7μ joules per pulse concentrated in an area of 20 μm φ through the photomask 6 and the projection lens 7, namely under a laser irradiating condition with an energy density of 15 terawatt/cm$^2$ per pulse, on a silicon crystal constituting the work article 2 in a state where the temperature is maintained at about 250° C. with a radiation of 0.5 seconds for giving about 500 laser pulses in total to form an etched hole of a depth of about 30 μm.

The working of the present embodiment employing crystalline silicon in the state heated at 250° C. allows to achieve clean etching without deposit around the worked hole, as shown in FIG. 4.

On the other hand, in case the silicon crystal was etched at the normal temperature, liquefied silicon was deposited in solid around the worked hole as shown in FIG. 3. The solidified silicon could not be removed easily by mere rinsing with running water. Thus, in comparison with working at the normal temperature, the working method of the present embodiment allows to form an extremely clean worked hole without deposit. The deposit tended to decrease as the temperature of crystalline silicon becomes higher from the normal temperature (23° C.), but the deposit remained at a temperature less than 200° C.

[Embodiment 5]

Figure 8:
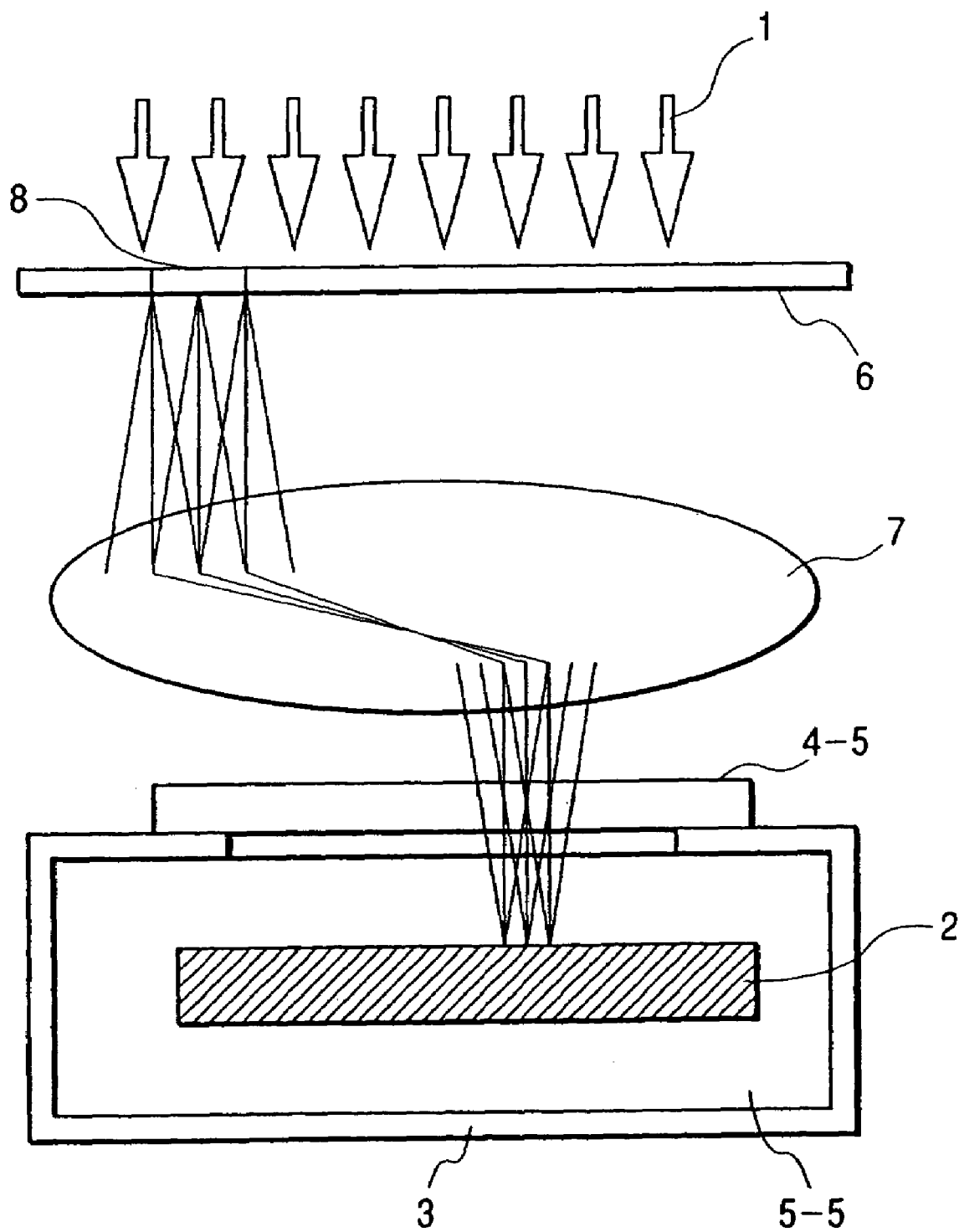
FIG. 8 is a view showing the laser etching method in an embodiment 5 of the present invention.

Now reference is made to FIG. 8 for outlining the working method of the present embodiment. A laser light 1, emitted from an unrepresented laser oscillator, capable of emitting the laser light with an extremely short pulse emission time (not exceeding 1 picosecond), after being modulated by a mechanical shutter 4-1 into a pulse train 5-1 of laser light cut in time, illuminates a photomask 6, and the light transmitted by a mask pattern 8 is projected and focused through a projection lens 7. The projected image is focused on the surface of a work article 2 formed of an inorganic material.

On the other hand, the work article 2 is enclosed by a chamber 3 and a window 4-5 capable of transmitting light, and the space around the work article 2 is filled with reduced pressure air 5-5 of which pressure is reduced to 10 Torr or less by an unrepresented pump. The laser light 1 is irradiated in pulses in such state to effect sublimation ablation working of the work article 2.

In the working method of the present embodiment, the continuous laser irradiation etching was executed by employing a laser light of a wavelength of 775 nm, a laser pulse oscillation frequency of 1 kHz, a laser irradiation pulse duration of about 150 femtoseconds, an optical energy of about 7μ joules per pulse concentrated in an area of 20 μm φ through the photomask 6 and the projection lens 7, namely under a laser irradiating condition with an energy density of 15 terawatt/cm$^2$ per pulse, on a silicon crystal for a period of 0.5 seconds in the air of a pressure of 5 Torr thereby giving about 500 laser pulses in total to form an etched hole of a depth of about 30 μm.

The working of the present embodiment, in case of working crystalline silicon in the air of a pressure of 5 Torr, allows to achieve clean etching without deposit around the worked hole, as shown in FIG. 4.

On the other hand, in case the crystalline silicon was etched in the air of normal pressure, liquefied silicon was deposited in solid around the worked hole as shown in FIG. 3. The solidified silicon could not be removed easily by mere rinsing with flowing water. Thus, in comparison with the working in the air of normal pressure, the working method of the present embodiment allows to form an extremely clean worked hole without deposit. The deposit tended to decrease as the pressure of the atmosphere around the crystalline silicon becomes lower from the normal pressure (760 Torr), but the deposit remained at a pressure exceeding about 10 Torr.

As explained in the foregoing, the present invention provides a laser etching method and a laser etching apparatus capable, in laser etching of a work article formed of an inorganic material, of working without deposition around the etching position, and capable of fine working of a material for a micromachine, an IC or a diode device.

In a configuration of the present invention wherein the irradiation of the work article is executed with intermittent irradiation with an interval longer than the oscillation frequency of the pulsed laser, an etching pause time can be provided after predetermined etching to realize a working sequence in which the etching is re-started after the plasma cloud consisting of atomic or molecular particles is scattered, whereby extremely clean working is made possible without deposit around the etching position, as encountered i the conventional continuous etching operation.

In a configuration of the present invention wherein the working is executed in a state where a gas flow is generated in the working position of the work article, the atomic or molecular particles emitted by ablation are excluded from the work position by collection with the gas flow and remain less in the vicinity of the etching position, whereby extremely clean working is made possible without deposit around the etching position.

Also in the present invention, by employing helium gas for forming an atmosphere other than air, the atomic or molecular particles emitted by ablation can be made to proceed straight without remaining in the vicinity of the etching position, whereby working can be achieved without deposit around the etching position.

Also in the present invention, by employing hydrogen gas for forming an atmosphere other than air, particularly in case the work article is composed of silicon, it is made possible to convert the silicon atoms in a gaseous stable state, in addition to the aforementioned effect, whereby working can be achieved without deposit around the etching position.

Also in the present invention, by employing water for forming an atmosphere other than air, the atomic or molecular particles emitted by ablation are fetched in water and prevented from re-deposition, whereby working can be achieved without deposit around the etching position.

Also in the present invention, by employing silicone oil for forming an atmosphere other than air, the atomic or molecular particles emitted by ablation are fetched in silicone oil and prevented from re-deposition, whereby working can be achieved without deposit around the etching position.

Also in a configuration of the present invention wherein the irradiation of the work article is executed in a state where the work article is heated to 200° C. or higher, the atomic or molecular particles emitted by ablation require a longer time for cooling and liquefaction by the heat from the heated inorganic material and are liquefied or solidified in a position distant from the inorganic material constituting the work article by cooling from the air during the flight, whereby the solid deposition around the etching position is reduced.

Also in a configuration of the present invention wherein the working of the work article is executed in a state where the work article is positioned in a gaseous atmosphere of a pressure not exceeding 10 Torr, the atomic or molecular particles emitted by ablation fly in a space of a low pressure with a fewer number of atomic or molecular particles and show a lower probability of collision between the particles, thereby increasing the average flight path and less subjected to the changes in the proceeding direction, whereby the particles tend to proceed straight and remain less in the vicinity of the etching position to achieve extremely clean working without deposit around the etching position.

Furthermore, the foregoing five embodiments may be combined to present deposition in the vicinity of the work area.

For example, there may be adopted a combination of the first embodiment (intermittent laser irradiation), the second embodiment (gas flow blowing) and the fourth embodiment (heating of work article), or a combination of the third embodiment (gaseous atmosphere) and the fourth embodiment (heating of work article), or a combination of the first embodiment (intermittent laser irradiation) and the fifth embodiment (reduced pressure atmosphere).

What is claimed is:

1. A laser etching method for optical ablation working by irradiating a work article formed by an inorganic material with a femtosecond laser light emitted in successive trains of light pulses, the laser etching method comprising:
    an etching step of laser etching the work article by irradiating the trains of light pulses from the femtosecond laser light to the work article; and
    a scattering step of scattering during an etching pause time, from an etching position of the work article, a plasma cloud of an atomic or molecular particle released from the work article by the optical ablation caused by the femtosecond laser light at the etching step,
    wherein the etching pause time is provided between two trains of light pulses for a predetermined duration that is longer than a period of irradiating the work article with the train of light pulses.

2. A laser etching method according to claim 1, wherein, in irradiating the trains of light pulses from the femtosecond laser light to the work article, etching is executed by scattering the plasma cloud from the etching position by executing intermittent irradiation to said work article with a time interval longer than an oscillation frequency of the pulsed laser.

3. A laser etching method according to claim 1, wherein, in irradiating said work article with the trains of light pulses from the femtosecond laser light, a gas flow is generated to scatter said plasma cloud from said etching position.

4. A laser etching method according to claim 3, wherein the gas flow in the etching position of said work article is in an air flow.

5. A laser etching method according to claim 3, wherein the gas flow in the etching position of said work article is a nitrogen flow.

6. A laser etching method according to claim 1, wherein in irradiating said work article with the trains of light pulses from the femtosecond laser light, etching is executed in a manner that said femtosecond laser light is irradiated in a state where said work article is positioned in a gas that has an atomic weight smaller than that of a nitrogen molecule.

7. A laser etching method according to claim 6, wherein said gas is helium gas.

8. A laser etching method according to claim 6, wherein said gas is hydrogen gas.

9. A laser etching method according to claim 1, wherein in irradiating said work article with the trains of light pulses from the femtosecond laser, etching is executed in a manner that said femtosecond laser light is irradiated in a state where said work article is positioned in a liquid which transmits said femtosecond laser light.

10. A laser etching method according to claim 9, wherein the liquid transmitting the trains of light pulses from the femtosecond laser light is water.

11. A laser etching method according to claim 1, wherein, in irradiating the trains of light pulses from the femtosecond laser light to said work article, etching is executed by irradiating the femtosecond laser light in a state where said work article is heated to 200° C. or higher to scatter said plasma cloud from said etching position.

12. A laser etching method according to claim 1, wherein, in irradiating the trains of light pulses from the femtosecond laser light to said work article, etching is executed by irradiating the femtosecond laser light in a state where said work article is provided in a gaseous atmosphere of a pressure not exceeding 10 Torr to scatter the plasma cloud from said etching position.

13. A laser etching method according to claim 1, wherein said inorganic material is a crystal covalent bond.

14. A laser etching method according to claim 1, wherein said inorganic material is crystal or amorphous silicon.

15. A laser etching method according to claim 1, wherein said inorganic material is a silicon compound.

* * * * *

UNITED STATES PATENT AND TRADEMARK OFFICE
CERTIFICATE OF CORRECTION

PATENT NO. : 7,169,709 B2  Page 1 of 1
APPLICATION NO. : 10/943026
DATED : January 30, 2007
INVENTOR(S) : Koide It is certified that error appears in the above-identified patent and that said Letters Patent is hereby corrected as shown below:

COVER PAGE (Second Page)
(56) References Cited: should read as followings:
Foreign Patent Documents
"59 073 189" should read -- JP  59-073189 --;
"50 182 529" should read -- JP  59-182529 --;
"11 254 174" should read -- JP  11-254174 --; and
"11 316 760" should read -- JP  11-316760 --.

COLUMN 1:
Line 6, "6,861,364." should read -- 6,861,364, the contents of which are incorporated by reference herein. --.

Signed and Sealed this

Twenty-sixth Day of February, 2008

JON W. DUDAS
*Director of the United States Patent and Trademark Office*

UNITED STATES PATENT AND TRADEMARK OFFICE
CERTIFICATE OF CORRECTION

PATENT NO. : 7,169,709 B2  Page 1 of 1
APPLICATION NO. : 10/943026
DATED : January 30, 2007
INVENTOR(S) : Koide It is certified that error appears in the above-identified patent and that said Letters Patent is hereby corrected as shown below:

COVER PAGE (Second Page)
(56) References Cited:
Foreign Patent Documents
"59 073 189" should read -- JP 59-073189 --;
"50 182 529" should read -- JP 59-182529 --;
"11 254 174" should read -- JP 11-254174 --; and
"11 316 760" should read -- JP 11-316760 --.

COLUMN 1:
Line 6, "6,861,364." should read -- 6,861,364, the contents of which are incorporated by reference herein. --.

Signed and Sealed this

Fourth Day of March, 2008

JON W. DUDAS
*Director of the United States Patent and Trademark Office*